(No Model.)

C. M. REED & W. C. FRAZEE.
TRICYCLE.

No. 361,024. Patented Apr. 12, 1887.

WITNESSES.
Gustav Bohn
Hattie Murry

INVENTOR.
Charles M. Reed.
Wm. C. Frazee.
By C. P. Jacobs
Atty.

UNITED STATES PATENT OFFICE.

CHARLES M. REED, OF NEAR CONNERSVILLE, AND WILLIAM C. FRAZEE, OF NEAR CLERMONT, INDIANA.

TRICYCLE.

SPECIFICATION forming part of Letters Patent No. 361,024, dated April 12, 1887.

Application filed November 23, 1886. Serial No. 219,708. (No model.)

*To all whom it may concern:*

Be it known that we, CHARLES M. REED, residing near Connersville, Fayette county, Indiana, and WILLIAM C. FRAZEE, residing near Clermont, Marion county, Indiana, have made certain new and useful Improvements in Tricycles, a description of which is set forth in the following specification, reference being made to the accompanying drawings, in the several figures of which like letters refer to like parts.

Our invention relates to the construction of tricycles propelled by spring and gear mechanism, and will be understood from the following description.

Figure 1:
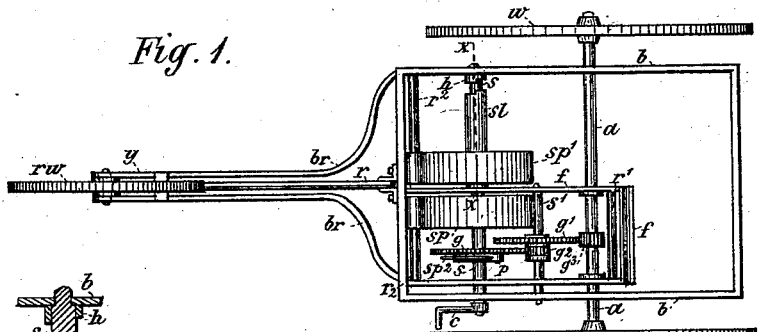
Figure 2:
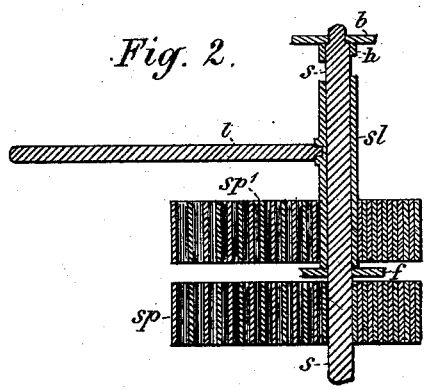
Figure 3:
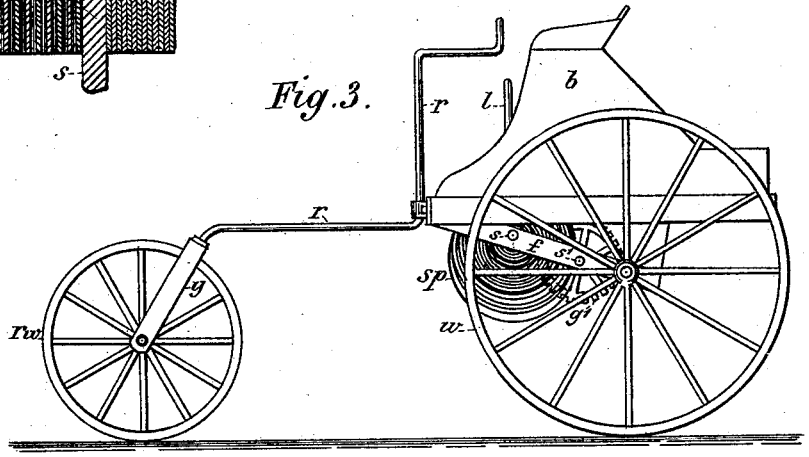

In the drawings, Figure 1 represents a bottom view of the device, showing the arrangement of the springs and gear mechanism beneath the box. Fig. 2 is a detail view, on a larger scale and in section, of the springs and the device for throwing the auxiliary spring in or out of gear. Fig. 3 is a side view of the device as shown in Fig. 1.

In detail, $b$ is the box of the tricycle, mounted between the two road-wheels $w$, which revolve on the axle $a$.

$f$ is a frame-work, set beneath the box, inclosing the gear mechanism. This frame furnishes bearings for the rod $r^2$, to which the end of the driving-spring $sp$ is attached. This driving-spring $sp$ is coiled about the shaft $s$, which also carries the gear-wheel $g$, which intermeshes with the smaller gear-wheel, $g^2$, mounted on the shaft $s'$, which also carries a gear-wheel, $g'$, which intermeshes with the smaller gear-wheel, $g^3$, mounted on the axle $a$.

$c$ is a crank for revolving the shaft $s$ and winding up the driving-spring $sp$. This spring, when wound up, imparts motion to the shaft $s$, revolving the gear-wheel $g$ and the other gear-wheels connected therewith, and motion is thus imparted to the axle $a$ and the road-wheels of the tricycle.

$br$ are curved braces, which extend forward and are connected with the yoke $y$, in which the rudder-wheel $rw$ is journaled.

$r$ is the rudder or handle, which extends up in front of the seat for the rider to steer the vehicle by.

$sp'$ is a second or auxiliary spring, the end of which is connected to the rod $r^2$. This spring is coiled about a sleeve $sl$, which surrounds one-half of the shaft $s$. To this sleeve is connected a lever, $l$, as shown in Fig. 2. The end of this sleeve is offset to correspond with similar offsets on the hub $h$, which is rigidly connected to the end of the shaft $s$, the outer end of this shaft having bearings in the side of the box $b$. This auxiliary spring may be thrown in or out of gear by means of the lever $l$. Thus, if it be moved so that its offsets will engage with the offsets on the hub $h$, the sleeve will revolve with the shaft, and the force of the spring $sp'$ will co-operate with the force of the spring $sp$ in driving the mechanism. When it is desired, the spring $sp'$ may be thrown out of gear by simply throwing it back with the lever $l$ in the position shown in Fig. 2, so that one spring or two may be used for driving the vehicle, as may be desired.

We are aware that coiled springs and gear mechanism have been used for driving mechanism, and do not broadly claim the same as our invention.

What we do claim, however, and desire to secure by Letters Patent, is the following:

1. In a spring mechanism for imparting motion, the combination of the main driving-spring with gear mechanism connecting the driving-spring shaft with the axle of the mechanism to be driven, and an auxiliary spring coiled about a sleeve mounted upon the shaft of the driving-spring and adapted to be thrown in and out of gear by means of the lever $l$, or other suitable device, substantially as described.

2. A tricycle composed of a box mounted between two road-wheels, a frame carried beneath said box, containing a main driving-spring mounted on a shaft carrying a pinion connecting with one or more smaller pinions mounted upon secondary shafts and the axle of the vehicle, whereby the force of the driving-spring is adapted to revolve the axle of the vehicle, and an auxiliary spring mounted on a sleeve surrounding a portion of the shaft of the main driving-spring and adapted to be thrown in or out of gear by means of a lever or other suitable device, whereby the force of either or both of the springs may be used in propelling the vehicle, all combined substantially as described.

In witness whereof we have hereunto set our hands, this 9th day of November, 1886, at Indianapolis, Indiana, in the presence of witnesses.

CHAS. M. REED.
WM. C. FRAZEE.

Witnesses:
C. P. JACOBS,
HATTIE MURRY.